E. W. SMITH.
SECONDARY BATTERY PLATE OR ELECTRODE.
APPLICATION FILED SEPT. 4, 1918.

1,370,058.  Patented Mar. 1, 1921.

WITNESS:

INVENTOR
Edward Wanton Smith
BY
Augustus B Stoughton
ATTORNEY

UNITED STATES PATENT OFFICE.

EDWARD WANTON SMITH, OF PHILADELPHIA, PENNSYLVANIA.

SECONDARY-BATTERY PLATE OR ELECTRODE.

1,370,058.   Specification of Letters Patent.   Patented Mar. 1, 1921.

Application filed September 4, 1918. Serial No. 252,563.

*To all whom it may concern:*

Be it known that I, EDWARD WANTON SMITH, a citizen of the United States, residing at Philadelphia, in the county of Philadelphia and State of Pennsylvania, have invented certain new and useful Improvements in Secondary-Battery Plates or Electrodes, of which the following is a specification.

My invention relates to improvements in plates or elements which include in their construction conducting rods embedded in active material or material to become active inclosed in slotted hard rubber insulating tubes, and an end bar connecting said rods and provided with projections entering the ends of said tubes.

In such plates or elements the slotted end portions of the tubes which received the projections on the connecting bar were weak and liable to fail and it was difficult or impossible to trim such slotted ends accurately in order to get the tubes of uniform lengths.

The principal object of the present invention is to avoid those defects and disadvantages and to improve the end construction of those plates or electrodes.

The invention will be claimed at the end hereof but will be first described in connection with the accompanying drawings forming part hereof and in which—

Figure 1:
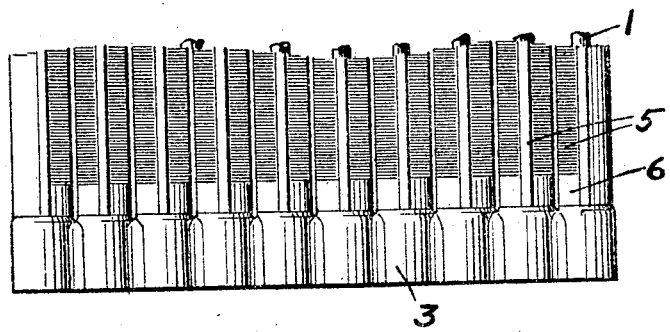
Figure 1, is a side elevation of part of a plate or electrode embodying features of the invention.
Figure 2:
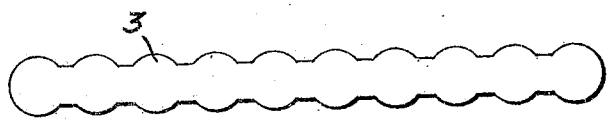
Fig. 2, is a plan view of the bottom of the same.
Figure 3:
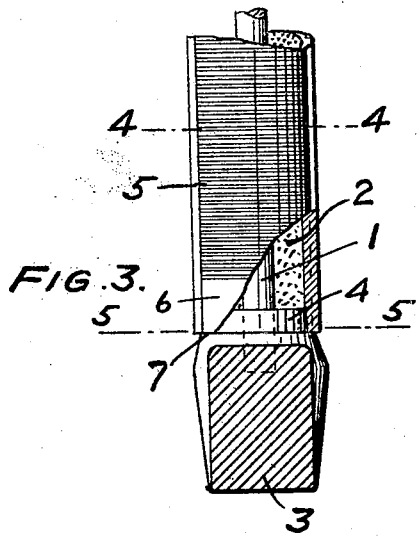
Figure 4:
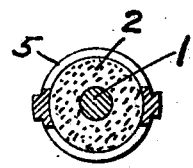
Figure 5:
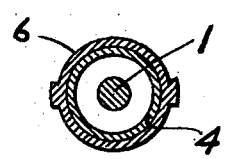

Fig. 3, is a sectional view, drawn to an enlarged scale, and illustrating features of the invention, and Figs. 4 and 5, are respectively sections on the lines 4—4 and 5—5, of Fig. 3.

In the drawings 1, are metal rods surrounded by active material or material adapted to become active 2, and 3 is an end-connecting bar connecting said rods and provided with projections 4. These are features or parts of well known plates or electrodes and they may be variously constructed. 5, are slotted and ribbed tubes or envelops, as of hard rubber, or other suitable material, and therefore brittle, and they surround the active material or material adapted to become active and are provided at their ends with imperforate cuffs or extensions 6, receiving the projections 4, and abutting upon the bar 3, as at 7. The walls of these cuffs are solid and the ends of the tubes are therefore strong and can be readily trimmed to length if desired.

I claim:

1. In a storage battery plate or electrode, including metal rods surrounded with active material or material adapted to become active and an end bar connecting said rods and provided with projections, and in combination therewith, perforated tubes or envelops surrounding the active material and provided at their ends with imperforate cuffs receiving said projections, substantially as described.

2. In a storage battery plate a slotted tube or envelop provided at its end with an imperforate cuff.

EDWARD WANTON SMITH.